(12) United States Patent
Hsieh et al.

(10) Patent No.: US 7,737,955 B2
(45) Date of Patent: *Jun. 15, 2010

(54) ELECTRONIC DEVICE AND METHOD PROVIDING A TOUCH-BASED INTERFACE FOR A DISPLAY CONTROL

(75) Inventors: Kuan-Hong Hsieh, Guangdong (CN); Han-Che Wang, Guangdong (CN); Xiao-Guang Li, Guangdong (CN); Wen-Chuan Lian, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 675 days.

This patent is subject to a terminal disclaimer.

(21) Appl. No.: 11/308,891

(22) Filed: May 23, 2006

(65) Prior Publication Data
US 2007/0146335 A1 Jun. 28, 2007

(30) Foreign Application Priority Data
Sep. 30, 2005 (CN) .................. 2005 1 0100060

(51) Int. Cl.
G09G 5/00 (2006.01)
(52) U.S. Cl. ..................................... 345/173
(58) Field of Classification Search ............. 345/156, 345/168, 169, 173; 455/566
See application file for complete search history.

(56) References Cited

U.S. PATENT DOCUMENTS

| 4,545,023 | A | * | 10/1985 | Mizzi | 708/143 |
|---|---|---|---|---|---|
| 5,515,044 | A | * | 5/1996 | Glatt | 341/22 |
| 6,020,877 | A | | 2/2000 | Smith | |
| 6,034,668 | A | | 3/2000 | Jackson | |
| 6,229,502 | B1 | * | 5/2001 | Schwab | 345/1.1 |
| 6,535,144 | B1 | | 3/2003 | Motoe | |
| 6,975,306 | B2 | * | 12/2005 | Hinckley et al. | 345/173 |
| 6,989,815 | B2 | * | 1/2006 | Liang et al. | 345/156 |
| 2003/0142081 | A1 | * | 7/2003 | Iizuka et al. | 345/173 |

\* cited by examiner

*Primary Examiner*—Amr Awad
*Assistant Examiner*—Stephen G Sherman
(74) *Attorney, Agent, or Firm*—Winston Hsu

(57) ABSTRACT

An electronic device and method providing a touch-based interface for a display control is provided. The electronic device includes a display, and a processing unit. The display includes a screen installed with a cursor thereon and a frame attached to the screen. The frame further has a first touch sensitive region and a second touch sensitive region for generating sensing signals in response to an input operation. Each sensing signal is assigned a coordinate for identification. The processing unit identifies the sensing signals according to the coordinates assigned therewith, controls a movement of the cursor displayed on the screen if the identified sensing signals from the first touch sensitive region, and controls a movement of pages displayed on the screen if the identified sensing signals from the second touch sensitive region. A related method is also provided.

3 Claims, 5 Drawing Sheets

ELECTRONIC DEVICE AND METHOD PROVIDING A TOUCH-BASED INTERFACE FOR A DISPLAY CONTROL

TECHNICAL FIELD

The present invention relates to user interactive devices and methods, and particularly to a user interactive device and method that are user friendly, particularly with respect to a display control.

GENERAL BACKGROUND

With the advent and introduction of the graphical user interface (GUI), today's computers are driven much more by the cursor control device than ever before. Accordingly, a wide variety of techniques for positioning a cursor on a computer display are available and well known in the computer industry.

A conventional cursor control device is a keyboard. A user can press a variety of keys on the keyboard to control movement of the cursor. However, this cursor movement manner becomes inconvenient when sizes of the keyboards get smaller.

Another conventional cursor control device is a mouse. The user can push the mouse in the direction of the desired cursor movement. Nevertheless, the mouse generally suffers from one or more deficiencies. For example, the mouse requires the user to move his or her hand across large areas to operate efficiently and to permit movement of the cursor throughout the display area. However, the user's workspace is often limited, as a result, the user must repeatedly lift the mouse. Furthermore, these repetitive operations may also lead to physical fatigue and repetitive stress injuries to the user.

What is needed, therefore, is an electronic device and method for display control that can provide a friendly and convenient user interface allowing easy display control.

SUMMARY

An electronic device providing a touch-based interface for a display control is provided. The device mainly includes a display and a processing unit. The display includes a screen installed with a cursor thereon and a frame attached to the screen. The frame further has a first touch sensitive region and a second touch sensitive region for generating sensing signals in response to an input operation. Each sensing signal is assigned a coordinate for identification. The processing unit identifies the sensing signals according to the coordinates assigned to the sensing signals, controls a movement of the cursor displayed on the screen if the identified sensing signals from the first touch sensitive region, and controls a movement of pages displayed on the screen if the identified sensing signals from the second touch sensitive region.

A touch-based method for a display control on an electronic device is also provided. The method includes the steps of: (a) providing a display on the electronic device, the display having a screen and a frame thereof, the frame having a first touch sensitive region and a second touch sensitive region for generating sensing signals in response to an input operation, each sensing signal assigned a coordinate for identification; (b) identifying the sensing signals according to the coordinates assigned to the sensing signals; (c) controlling a movement of a cursor displayed on the screen if the identified sensing signals from the first touch sensitive region; and (d) controlling a movement of pages displayed on the screen if the identified sensing signals from the second touch sensitive region.

Other advantages and novel features will be drawn from the following detailed description with reference to the attached drawing, in which:

DETAILED DESCRIPTION

Figure 1:
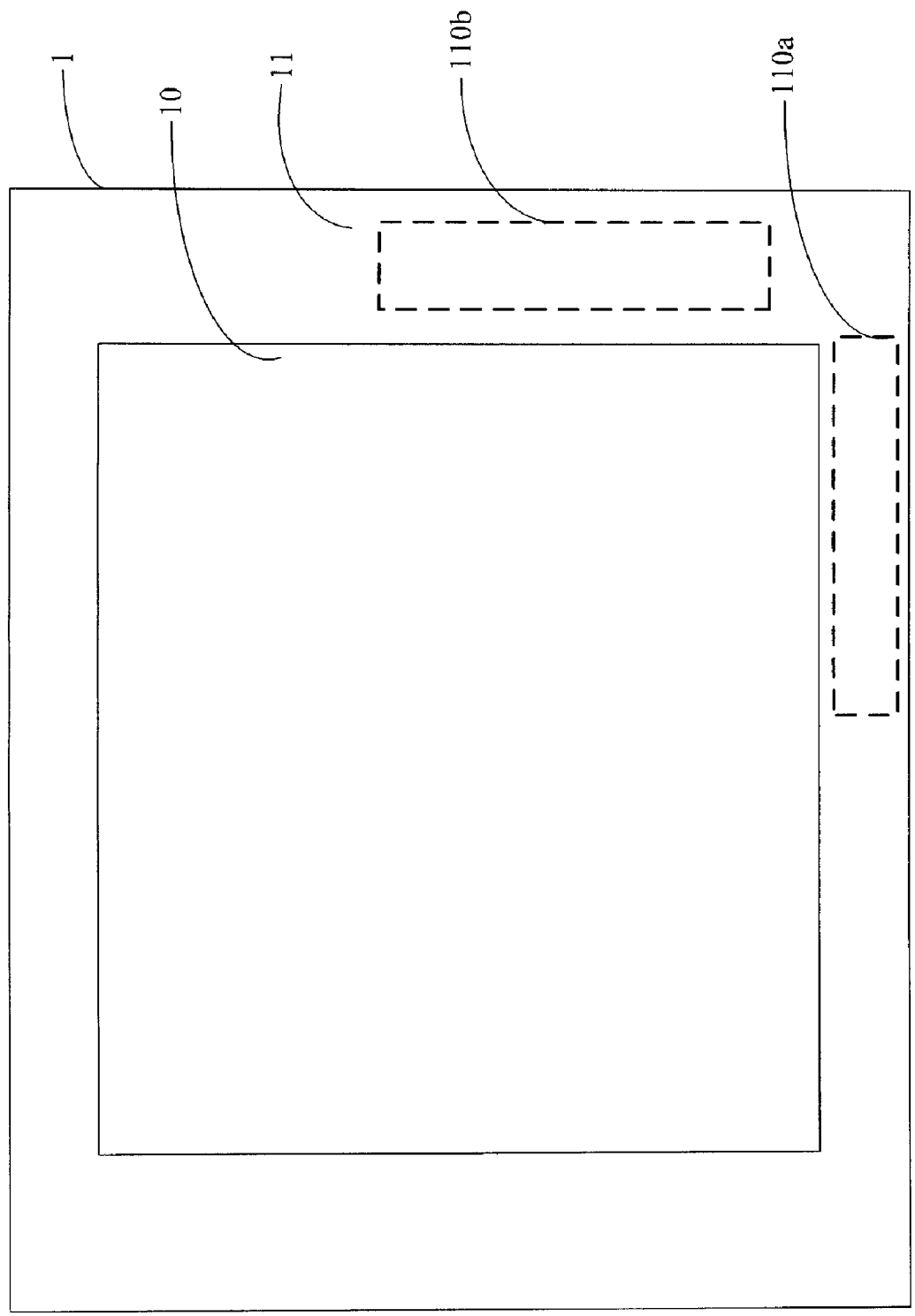
FIG. 1 is a schematic diagram showing an electronic device providing a touch-based interface for a display control in accordance with a preferred embodiment of the present invention, the electronic device including a frame which has two touch sensitive regions thereon.

FIG. 1 is a schematic diagram showing an electronic device providing a touch-based interface for a display control in accordance with a preferred embodiment of the present invention. The electronic device includes a display 1. The display 1 further includes a screen 10 and a frame 11 thereof.

The frame 11 has a first touch sensitive region 110a and a second touch sensitive region 110b (each symbolically indicated as a dashed rectangular outline) for receiving a user's contact, thereby performing a corresponding function associated with the contacted touch sensitive region. That is, the first touch sensitive region 110a is designated as a cursor control interface for cursor movement control, and the second touch sensitive region 110b is designated as a page control interface for page movement control. Each touch sensitive region 110a/110b includes a plurality of touch sensitive units beneath. Each touch sensitive unit further is assigned a coordinate for identification, and a sensing signal processing circuit 2 (described in more detail below) for generating sensing signals. In other words, each touch sensitive region 110a/110b is capable of generating sensing signals to perform the associated function therewith in response to an input operation.

Figure 2:
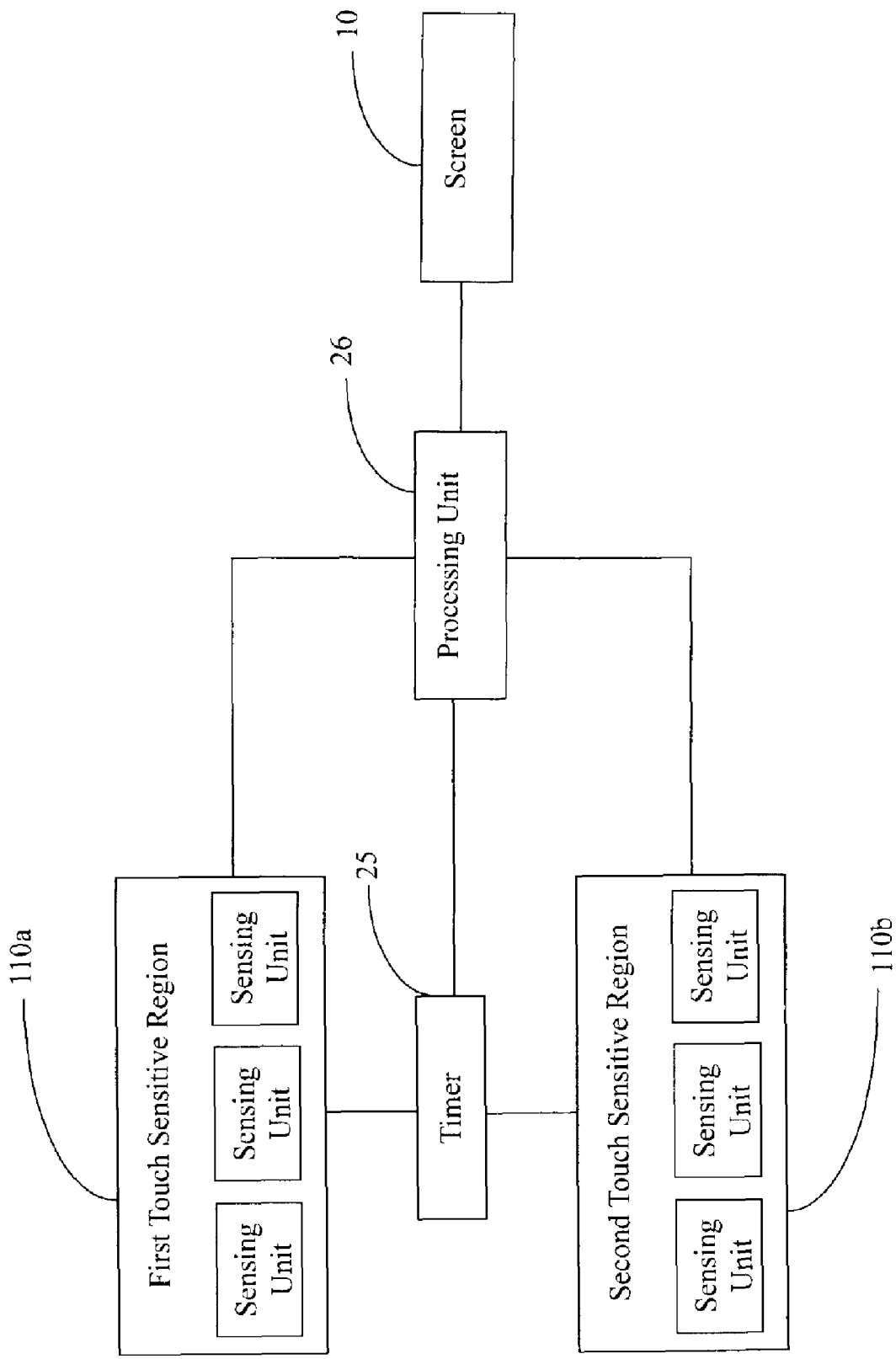
FIG. 2 is a schematic block diagram of a hardware infrastructure of the electronic device of FIG. 1.

FIG. 2 is a schematic block diagram of a hardware infrastructure of the electronic device of FIG. 1. As compared to that shown in FIG. 1, the electronic device further includes a timer 25 and a processing unit 26. The timer 26 records a time duration of continuously receiving the sensing signals from the touch sensitive region 110a/110b. The processing unit 25 identifies the sensing signals according to the coordinates assigned therewith, and performs the function associated with the identified sensing signals. For example, if the sensing signals comes from the first touch sensitive region 110a, the processing unit 26 controls the movement of the cursor displayed on the screen 10 in response to the input operation on the first touch sensitive region 110a; alternatively, if the sensing signals comes from the second touch sensitive region 110b, the processing unit 26 controls the movement of pages displayed on the screen 10 in response to the input operation on the second touch sensitive region 110b.

The processing unit 26 further determines a direction of the input operation according to coordinates assigned to the sensing signals and a speed of the input operation according to the time duration of the timer 25, and performs a particular display control in the determined direction and speed. For example, with respect to cursor movement control, if the processing unit 26 determines that the speed of the input operation on the first touch sensitive region 110a is a normal speed, that is the time duration of continuously receiving the sensing signals therefrom is greater than a first predetermined value (symbolically expressed as 'T1'), the processing unit 26 thereupon moves the cursor on the screen 10 word by word; if the processing unit 26 determines that the speed of the input operation on the first touch sensitive region 110a is a high speed, that is the time duration of continuously receiving the sensing signals therefrom is less than or equal to the first predetermined value T1, the processing unit 26 moves the cursor on the screen 10 line by line.

Similarly, with respect to page movement control, if the processing unit 26 determines that the speed of the input operation on the second touch sensitive region 110b is a normal speed, that is the time duration of continuously receiving the sensing signals therefrom is greater than a second predetermined value (symbolically expressed as 'T2'), the processing unit 26 thereupon flips a single page on the screen 10; if the processing unit 26 determines the speed of the input operation on the second touch sensitive region 110b is a high speed, that is the time duration of continuously receiving the sensing signals therefrom is less than or equal to the second predetermined value T2, the processing unit 26 thereupon flips a number of pages on the screen 10.

Therefore, by utilizing the electronic device, the user can easily and effectively control the display on the screen (i.e., cursor movement control or/and page movement control), regardless of a size of the electronic device or a workspace for operating the electronic device.

Figure 3:
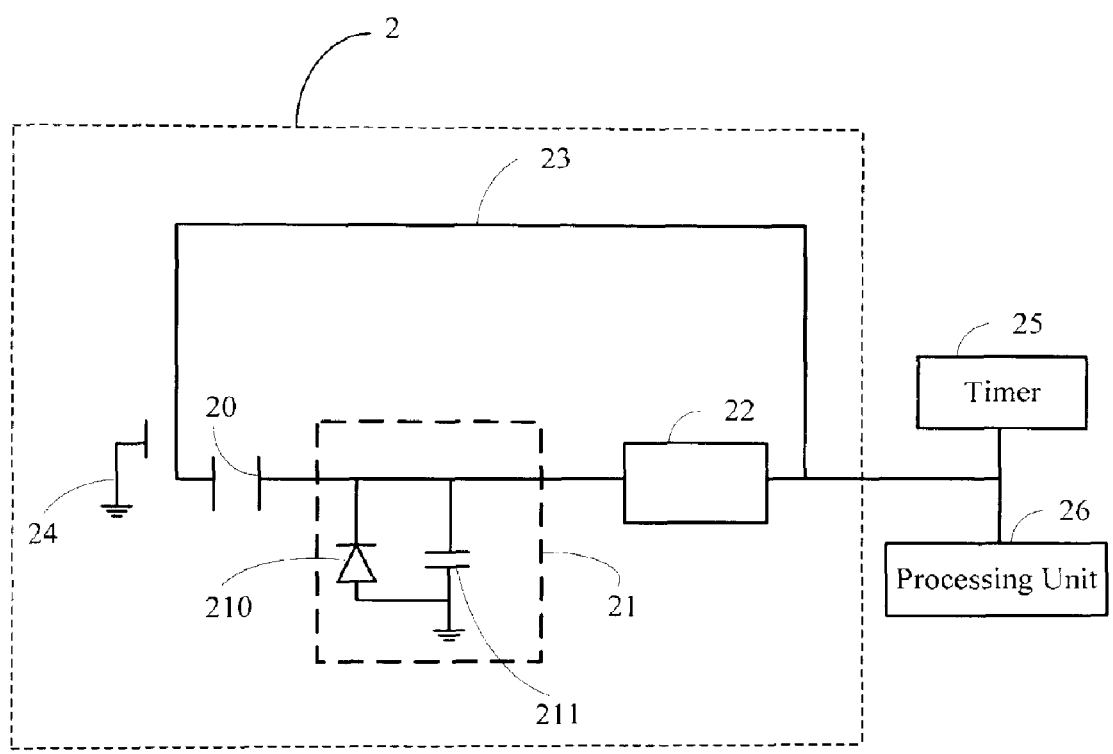
FIG. 3 is an exemplary block diagram representing a hardware infrastructure of a sensing signal processing circuit for a touch sensitive unit beneath the touch sensitive regions of FIG. 1 with the sensing signal processing circuit connecting to a processing unit.

FIG. 3 is an exemplary block diagram representing a hardware infrastructure of the sensing signal processing circuit for the touch sensitive unit beneath the touch sensitive region of FIG. 1 with the sensing signal processing circuit connecting to the processing unit 26. The sensing signal processing circuit 2 mainly includes an antenna 20, a clamping circuit 21, a detector 22, a feedback line 23, and a grounding line 24. The antenna 20 is connected to the clamping circuit 21. The clamping circuit 21 is connected to an input end of the detector 22. An output end of the detector 22 is respectively connected to the processing unit 12 and an end of the feedback line 23. The feedback line 23 forms a positive feedback circuit with the antenna 21. The grounding line 24, namely a space between two adjacent touch sensitive units, is for spacing the touch sensitive units therebetween.

The human body is itself electrically charged with noise and static signals. Therefore, when a user touches the touch sensitive region 110a/110b, the noise and static signals of the user flow through the antenna 20. The antenna 20 transmits the noise and static signals to the clamping circuit 21. However, the static electrical signals may cause interference to the noise, and may even fry the detector 22. In addition, a strong noise may adversely influence a resulting sensing signal for the processing unit 26; that is, the sensitivity of the touch sensitive unit may be diminished. Accordingly, the clamping circuit 21 is for eliminating the static signals and for reducing the noise, thus improving the sensitivity accuracy of the touch sensitive unit.

The clamping circuit 21 includes a diode 210, and a capacitor 211. The anode of the diode 210 is connected to the antenna 20, while the cathode is connected to ground. Upon receiving the noise and static signals, the diode 210 filters out the static signals to ground so as to avoid frying the detector 22, and reducing the noise influencing to the capacitor 211. The capacitor 211 further leaks a portion of the reduced noise to ground. Thus the reduced noise is further weakened, thereby obtaining a more accurate sensitivity.

The detector 22 has a high input impedance, so as to easily detect the reduced and weakened noise received from the input end of the detector 22. The detector 22 then converts the further reduced and weakened noise into digital signals, namely the sensing signals, and transmits the digital signals through the output end of the detector 22 to the processing unit 26 to perform corresponding controls. Furthermore, because the feedback line 23 forms a positive feedback circuit with the antenna 20, the noise generated as the user touches the edge of the touch sensitive unit is filtered, thereby further improving the sensitivity accuracy of the touch sensitive unit.

Figure 4:
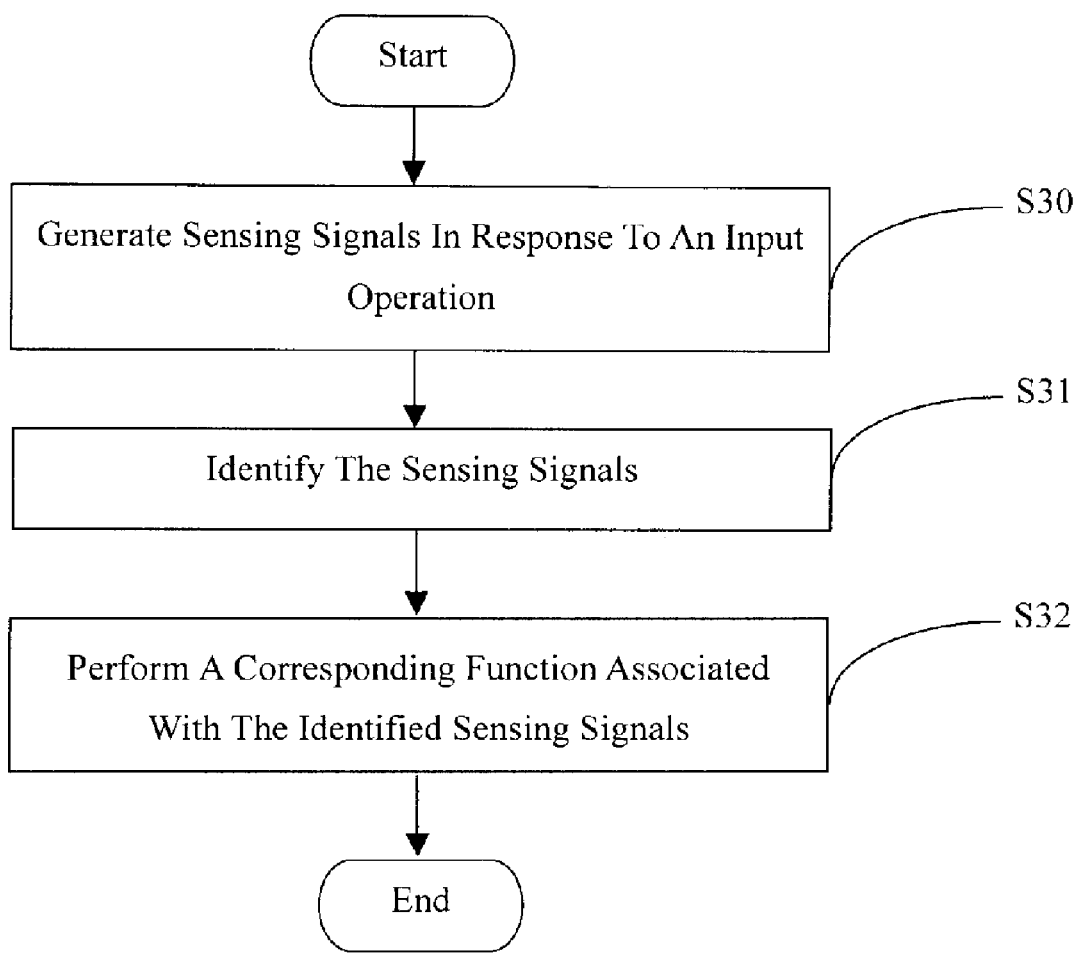
FIG. 4 is a flowchart of a preferred touch-based method for the display control on the electronic device of FIG. 1 in accordance with a preferred embodiment of the present invention.

FIG. 4 is a flowchart of a preferred touch-based method for the display control on the electronic device of FIG. 1 in accordance with a preferred embodiment of the present invention. In step S30, the touch sensitive region 110a/110b generates sensing signals in response to the input operation thereon, and transmits the sensing signals to the timer 25 and the processing unit 26 connected thereto. In step S31, the processing unit 26 identifies the sensing signals according to the coordinates assigned therewith. In step S32, the processing unit 26 performs a corresponding function associated with the identified sensing signals. For example, if the sensing signals are from the first touch sensitive region 110a, the processing unit 26 controls the movement of the cursor displayed on the screen 10, alternatively, if the sensing signals are from the second touch sensitive region 110b, the processing unit 26 controls the movement of pages displayed on the screen 10.

Figure 5:
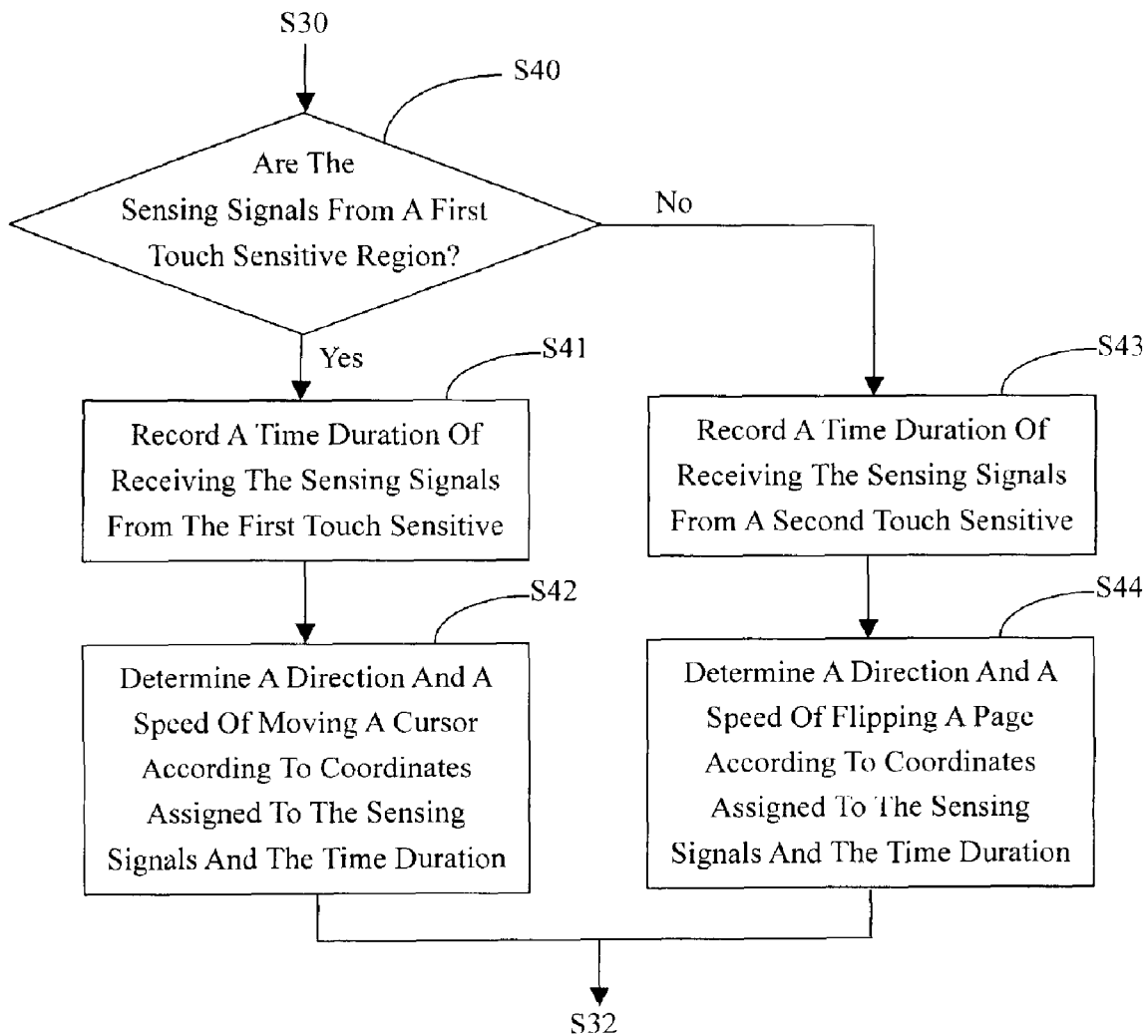
FIG. 5 is a flowchart further detailing steps involved in one step of FIG. 4, namely identifying sensing signals.

FIG. 5 is a flowchart further detailing steps involved in step S31 of FIG. 4, namely identifying sensing signals. In step S40, the processing unit 26 determines whether the sensing signals are from the first touch sensitive region 110a according to the coordinates assigned therewith. If so, in step S41, the timer 25 records the time duration of continuously receiving the sensing signals from the first touch sensitive region 110a. In step S42, the processing unit 26 determines the direction and speed of moving the cursor on the screen 10 according to coordinates assigned to the sensing signals and the time duration of the timer 25. For example, if the time duration is greater than the first predetermined value 'T1' the processing unit 26 displaces the cursor on the screen 10 by one word; and if the time duration is less than or equal to the first predetermined value 'T1', the processing unit 26 displaces the cursor on the screen 10 by one line.

If not, in step S43, the timer 25 records the time duration of continuously receiving the sensing signals from the second touch sensitive region 110b. In step S44, the processing unit 26 determines the direction and speed of flipping the page on the screen 10 respectively according to coordinates assigned to the sensing signals and the time duration of the timer 25. For example, if the time duration is greater than the second predetermined value 'T2', the processing unit 26 determines to flip a single page on the screen 10; and if the time duration is less than or equal to the second predetermined value 'T2', the processing unit 26 determines to flip a number of pages on the screen 10.

Although the present invention has been specifically described on the basis of a preferred embodiment and preferred method thereof, the invention is not to be construed as being limited thereto. Various changes or modifications may be made to the embodiment and method without departing from the scope and spirit of the invention.

What is claimed is:

1. An electronic device providing a touch-based interface for a display control, the device comprising:
   a display having a screen installed with a cursor thereon and a frame attached to the screen, the frame comprising a first touch sensitive region and a second touch sensitive region for generating sensing signals in response to an input operation, each sensing signal being assigned with a corresponding coordinate for identification; and
   a timer for recording a time duration of receiving the sensing signals;
   a processing unit being programmed for identifying the sensing signals are generated from which of the touch sensitive regions according to the coordinates assigned to the sensing signals, and determining a direction of the input operation according to the coordinates assigned to the sensing signals and a speed of the input operation according to the time duration of receiving the sensing signals only, and moving a cursor displayed on the screen word by word if the speed of the input operation is a normal speed, upon the identified sensing signals are generated from the first touch sensitive region, and flipping a number of pages if the speed of the input operation is a high speed, upon the identified sensing signals are generated from the second touch sensitive region, wherein the processing unit determines the speed of the input operation on the first touch sensitive region is the normal speed if the time duration of receiving the sensing signals is greater than a first predetermined value; and the processing unit determines the speed of the input operation on the second touch sensitive region is the high speed if the time duration of receiving the sensing signals is less than or equal to a second predetermined value.

2. The device according to claim 1, wherein each touch sensitive region further comprises a plurality of sensing units thereunder, each of which has a sensing signal processing circuit for generating the sensing signals.

3. A touch-based method for a display control on an electronic device, the method comprising the steps of:
   providing a display on the electronic device, the display having a screen installed with a cursor thereon and a frame attached to the screen, the frame comprising a first touch sensitive region and a second touch sensitive region for generating sensing signals in response to an input operation, each sensing signals being assigned with a corresponding coordinate for identification;
   recording a time duration of continuously receiving the sensing signals;
   identifying the sensing signals are generated from which of the touch sensitive regions according to the coordinates assigned to the sensing signals;
   determining a direction of the input operation according to the coordinates assigned to the sensing signals and a speed of the input operation according to the time duration of receiving the sensing signals only;
   moving a cursor displayed on the screen word by word if the speed of the input operation is a normal speed, upon the identified sensing signals are generated from the first touch sensitive region, wherein the speed of the input operation on the first touch sensitive region is determined to be the normal speed if the time duration of receiving the sensing signals is greater than a first predetermined value; and
   flipping a number of pages if the speed of the input operation is a high speed, upon the identified sensing signals are generated from the second touch sensitive region, wherein the speed of the input operation on the second touch sensitive region is determined to be the high speed if the time duration of receiving the sensing signals is less than or equal to a second predetermined value.

* * * * *